United States Patent [19]

Liebermann et al.

[11] Patent Number: 4,522,331
[45] Date of Patent: Jun. 11, 1985

[54] METHOD OF BRAZING WITH LOW MELTING POINT COPPER-TIN FOILS

[75] Inventors: Howard H. Liebermann; Claude D. Tahlmore, both of Randolph Township, Morris County, N.J.

[73] Assignee: Allied Corporation, Morris Township, Morris County, N.J.

[21] Appl. No.: 500,740

[22] Filed: Jun. 3, 1983

[51] Int. Cl.³ .................. B23K 35/30; B23K 35/14; C22C 9/02
[52] U.S. Cl. .................. 228/263.18; 148/433; 420/403; 428/606; 228/263.15
[58] Field of Search .................. 420/469, 470–475; 148/403, 11.5 C, 433; 228/263.15, 263.18; 428/674, 606; 164/462, 463

[56] References Cited

U.S. PATENT DOCUMENTS

| 2,117,106 | 5/1938 | Silliman | 228/263.18 |
| 4,148,973 | 4/1979 | Sexton et al. | 228/263.15 |
| 4,182,628 | 1/1980 | D'Silva | 148/403 |
| 4,209,570 | 6/1980 | DeCristofaro et al. | 420/485 |
| 4,314,661 | 2/1982 | DeCristofaro et al. | 228/263.15 |
| 4,448,851 | 5/1984 | Bose et al. | 420/470 |
| 4,448,852 | 5/1984 | Bose et al. | 420/403 |

FOREIGN PATENT DOCUMENTS

| 47247 | 4/1981 | Japan | 164/462 |
| 1389404 | 4/1975 | United Kingdom | 420/472 |

*Primary Examiner*—Peter K. Skiff
*Attorney, Agent, or Firm*—Ernest D. Buff; Gerhard H. Fuchs

[57] ABSTRACT

A copper based low melting point microcrystalline metal alloy composition consists essentially of about 0.1 to 28 weight percent tin, the balance being copper and incidental impurities.

3 Claims, 2 Drawing Figures

METHOD OF BRAZING WITH LOW MELTING POINT COPPER-TIN FOILS

DESCRIPTION

1. Field of the Invention

This invention relates to copper based, microcrystalline metal alloys and more particularly to a homogeneous, ductile brazing material useful for brazing metal articles such as those composed of copper and copper alloys.

2. Description of the Prior Art

Brazing is a process for joining metal parts, often of dissimilar composition, to each other. Typically, a filler metal that has a melting point lower than that of the metal parts to be joined together is interposed between the metal parts to form an assembly. The assembly is then heated to a temperature sufficient to melt the filler metal. Upon cooling, a strong, leak-tight joint is formed. Filler metals used are commonly in powder, wire or foil form, depending on the type of application. Foil form provides the advantage of preplacing the filler metal in the joint area, thus permitting brazing of complex shapes with minimum rejection.

The brazing alloys suitable for use with copper and copper alloys, designated AWS BAg, are well known compositions. These alloys contain substantial amounts of the precious metal silver (19 to 86 weight percent) and hence are expensive. Most of the AWS Bag compositions are fabricated to a foil form through a lengthy sequence of rolling and annealing steps, incurring substantial processing cost.

Consequently, there remains a need in the art for a homogeneous brazing material for joining copper and copper alloys that is free of precious metals and is preferably in foil, powder or wire form.

SUMMARY OF THE INVENTION

The present invention provides a low melting point copper based microcrystalline metal alloy composition. Generally stated, the composition consists essentially of about 0.1 to 28 weight percent Sn, the balance being Cu and incidental impurities.

In addition, the invention provides a homogeneous, ductile microcrystalline brazing foil having a composition consisting essentially of 0.1 to 28 weight percent Sn, the balance being Cu and incidental impurities. Preferably, the brazing foil of this invention consists essentially of 10 to 26 weight percent Sn, the balance being Cu and incidental impurities.

The homogeneous microcrystalline brazing foil of the invention is fabricated by a process which comprises forming a melt of the composition and quenching the melt on a rotating quench wheel at a rate of at least about $10^5$ °C./sec.

Further, there is provided in accordance with the invention, an improved process for joining two or more metal parts by brazing. The process comprises:
(a) interposing a filler metal between the metal parts to form an assembly, the filler metal having a melting temperature less than that of any of the metal parts;
(b) heating the assembly to at least the melting temperature of the filler metal; and
(c) cooling the assembly.

The improvement comprises employing, as the filler metal, a homogeneous, copper based foil that has the composition given above.

The filler metal foil is easily fabricable as homogeneous, ductile ribbon, which is useful for brazing as cast. Advantageously, the copper based metal foil can be stamped into complex shapes to provide braze preforms.

Advantageously, the homogeneous, ductile brazing foil of the invention can be placed inside the joint prior to the brazing operation. Use of the homogeneous, ductile copper based foil provided by this invention also permits brazing to be accomplished by processes such as dip brazing in molten salts, which are not readily accomplished with powder or rod-type fillers.

BRIEF DESCRIPTION OF THE DRAWINGS

The invention will be more fully understood and further advantages will become apparent when reference is made to the following detailed description of the preferred embodiments of the invention and the accompanying drawings in which:

FIG. 1a is a photomicrograph depicting the microstructure of a conventionally cast copper-tin containing alloy; and FIG. 1b is a photomicrograph depicting the homogeneous microcrystalline structure produced upon rapid solidification of the alloy shown in FIG. 1a.

DETAILED DESCRIPTION OF THE INVENTION

Figure 1:
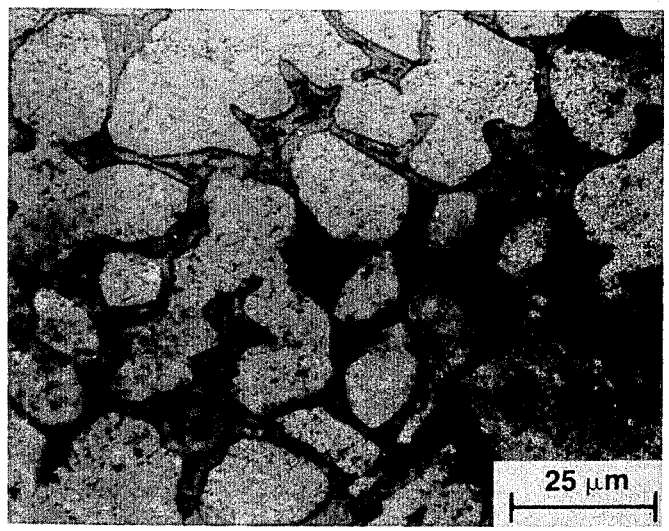
Figure 1:
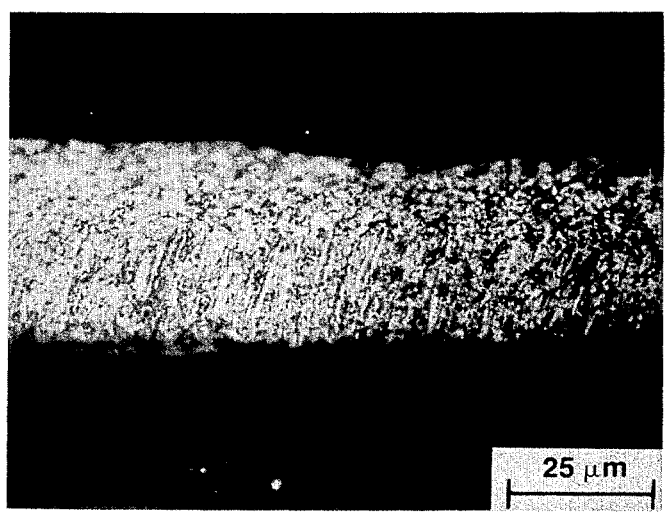

The term microcrystalline alloy, as used herein, means an alloy which, upon rapid solidification, has a grain size less than about 10 micrometers (0.004 in.). Preferably such an alloy has a grain size ranging from about 100 nanometers (0.000004 in.) to 10 micrometers (0.0004 in.), and most preferably from about 1 micrometer (0.00004 in.) to 5 micrometers (0.0002 in.).

Microcrystalline alloys are formed by cooling a melt of the desired composition at a rate of at least about $10^5$°C./sec. A variety of rapid quenching techniques, well known to the microcrystalline alloy art, are available for producing microcrystalline powders, wires, ribbon and sheet. Tyically, a particular composition is selected, powders or granules of the requisite elements in the desired portions are melted and homogenized, and the molten alloy is rapidly quenched on a chill surface, such as a rapidly rotating cylinder, or in a suitable fluid medium, such as water.

In any brazing process, the brazing material must have a melting point that will be sufficiently high to provide strength to meet service requirements of the metal parts brazed together. However, the melting point must not be so high as to make difficult the brazing operation. Further, the filler material must be compatible, both chemically and metallurgically, with the materials being brazed. The brazing material must be more noble than the metals being brazed to avoid corrosion. Ideally, the brazing material must be in ductile foil form so that complex shapes may be stamped therefrom. Finally, the brazing foil should be homogeneous, that is, contain no binders or other materials that would otherwise form voids or contaminating residues during brazing.

In accordance with the invention, a homogeneous, ductile microcrystalline brazing material in foil form is provided. The brazing foil includes compositions ranging from about 0.1 to 28 weight percent (0.054 to 17.2 atomic percent) Sn, the balance being Cu and incidental impurities.

These compositions are compatible with copper and copper-based alloys and are particularly suited for joining these materials.

By homogeneous is meant that the foil, as produced, is of substantially uniform composition in all dimensions. By ductile is meant that foil can be bent to a round radius as small as ten times the foil thickness without fracture.

Examples of brazing alloy compositions within the scope of the invention are set forth in Table I:

TABLE I

| Sample | Wt % Cu | Wt % Sn | Ductility |
|---|---|---|---|
| 1 | 99.9 | .1 | ductile |
| 2 | 95 | 5 | " |
| 3 | 89 | 11 | " |
| 4 | 80 | 20 | " |
| 5 | 76 | 24 | " |
| 6 | 74 | 26 | " |
| 7 | 72 | 28 | " |
| 8 | 69 | 31 | brittle |
| 9 | 30 | 70 | " |

TABLE II

| Sample | Composition | $T_l$, °C.(°F.) | $T_s$, °C.(°F.) |
|---|---|---|---|
| 1 | 99.9 Cu-0.1 Sn | 1084 (1983) | 1084 (1983) |
| 2 | 95 Cu-5 Sn | 1050 (1922) | 920 (1688) |
| 3 | 89 Cu-11 Sn | 1005 (1841) | 825 (1517) |
| 4 | 80 Cu-20 Sn | 895 (1643) | 799 (1470) |
| 5 | 76 Cu-24 Sn | 825 (1517) | 799 (1470) |
| 6 | 74 Cu-26 Sn | 793 (1459) | 756 (1393) |
| 7 | 72 Cu-28 Sn | 770 (1418) | 750 (1382) |
| 8 | 69 Cu-31 Sn | 755 (1391) | 795 (1463) |
| 9 | 30 Cu-70 Sn | 590 (1094) | 227 (441) |

Within the broad range disclosed above, there is a preferred composition range that is compatible with and permits brazing of copper and a wide range of copper alloys under a wide range of atmospheric conditions. Such preferred composition range permits copper and copper alloys to be joined under substantially all brazing conditions. The preferred compositions contain from about 10 to 26 weight percent Sn, and most preferably from about 24 to 26 weight percent Sn, the balance, in each case, being Cu and incidental impurities. In alloys having these preferred compositions, the freezing temperature is as much as 250° C. lower than that of Cu. The lower freezing temperature of the present alloys permits brazing of materials such as copper and copper based alloys and the like which could not heretofore be readily joined.

Further, in accordance with the invention, an improved process for joining two or more metal parts is disclosed. The process comprising:
 (a) interposing a filler metal between the metal parts to form an assembly, the filler metal having a melting temperature less than that of any of the metal parts;
 (b) heating the assembly to at least the melting temperature of the filler metal; and
 (c) cooling the assembly.

The improvement comprises employing, as the filler metal, at least one homogeneous, copper based foil having a composition within the ranges given above.

The brazing foils of the invention are prepared by rapid solidification from the melt in the same manner as microcrystalline foils. Under these quenching conditions, a homogeneous, sometimes metastable, ductile material is obtained. Such microcrystalline alloys can be sufficiently ductile to permit subsequent handling, such as stamping complex shapes from ribbons of the alloys.

The metastable phase may also be a supersaturated solid solution of the constituent elements. In the case of the alloys of the invention, such metastable, supersaturated solid solution phases are not ordinarily produced under conventional processing techniques employed in the art of fabricating crystalline alloys. X-ray diffraction patterns of the supersaturated solid solution alloys show the sharp diffraction peaks characteristic of crystalline alloys, with some broadening of the peaks due to desired fine-grained size of crystallites. Such metastable materials may also be ductile when produced under the conditions described above.

The brazing material of the invention is advantageously produced in foil (or ribbon) form, and may be used in brazing applications as cast, whether the material is microcrystalline and/or a solid solution. Alternatively, foils of microcrystalline alloys may be heat treated to cause solid state phase transformations in order to promote longer die life when stamping of complex shapes is contemplated.

Foils as produced by the processing described above typically are about 7 to 90 μm (0.00027 to 0.0035 inch) thick, which is also the desired spacing between bodies being brazed. Such spacing maximizes the strength of the braze joint. Thinner foils stacked to form greater thicknesses may also be employed. Further, no fluxes are required during brazing of prefixtured joints in controlled atmospheres, and no binders are present in the foil. Thus, formation of voids and contaminating residues is eliminated. Consequently, the ductile brazing ribbons of the invention provide both ease of brazing, by eliminating the need for spacers, and minimal post-brazing treatment.

The brazing foils of the invention are also superior to various powder brazes of the same composition in providing good braze joints. This is probably due to the ability to apply the brazing foil where the braze is required, rather than depending on capillarity to transport braze filler metal from the edge of surfaces to be brazed.

EXAMPLE 1

Ribbons having the compositions set forth in Table I and being 2.54 cm (1 inch wide) and about 33 micrometers (about 0.0013 inch) thick were formed by a melt of the particular composition by overpressure of argon onto a rapidly rotating copper chill wheel (surface speed about 30 m/s or 6000 ft/min). Homogeneous microcrystalline alloy ribbons were produced, as shown in the micrograph of FIG. 1. The coarse metallurgical phase distribution shown in FIG. 1a, is seen to be refined into a homogenized microcrystalline structure by rapid solidifaction into ribbon, shown in FIG. 1b. The ribbons were tested for bend ductility. A ribbon was determined to be ductile if it could be bent to a round radius of approximately ten times the ribbon's thickness without fracture. The compositions and ductility of ribbons are set forth in Table I.

EXAMPLE 2

The liquidus and solidus temperatures, $T_l$ and $T_s$, of selected ribbons in Table I were determined by Differential Thermal Analysis (DTA) technique. These temperatures are set forth in Table II.

Having thus described the invention in rather full detail, it will be understood that such detail need not be strictly adhered to but that various changes and modifications may suggest themselves to one skilled in the art, all falling within the scope of the present invention as defined by the subjoined claims.

What is claimed is:

1. A process of brazing together two or more metal parts which comprises:
    (a) interposing a filler metal between the metal parts to form an assembly, the filler metal having a melting point less than that of any of the parts;
    (b) heating the assembly to at least the melting temperature of the filler metal; and
    (c) cooling the assembly; wherein the improvement comprises employing, as the filler metal, a homogeneous copper based foil having a composition consisting essentially of 0.1 to 28 atom percent tin, said foil formed from a melt of said composition at a quenching rate of at least about 10$^5$° C./S, the balance being copper and incidental impurities.

2. The process of claim 1 in which the ductile filler metal foil has a composition consisting essentially of 10 to 26 weight percent tin, the balance being copper and incidental impurities.

3. The process of claim 1 in which the total thickness of the foil ranges from 7 to 90 micrometers (0.00027 to 0.0035 inch).

* * * * *